Dec. 4, 1923.

P. R. PERKINS

GAME

Filed July 30, 1921

| TIME TABLE BANGOR TO SEATTLE | | |
|---|---|---|
| DESTINATION | MILES | TRAIN LEAVES |
| BANGOR ME. POPULATION 26,000 | | 7  2 |
| BOSTON MASS. 748,000 | | 12  11 |
| ALBANY N.Y. 113,000 | 200 | 5  8 |
| BUFFALO N.Y. 506,000 | 326 | 1  3 |
| CLEVELAND. OHIO 796,000 | 183 | 11  10 |
| DETROIT, MICH 993,000 | 171 | 5  1 |
| CHICAGO, ILL. 2,700,000 | 272 | 10  12 |
| MADISON WISC. 38,000 | 133 | 5  2 |
| MINNEAPOLIS, MINN. 380,000 | 272 | 6  7 |
| BISMARCK. N. DAK. 7000 | 446 | 3  4 |
| BUTTE, MONT. 41000 | 682 | 9  6 |
| BOISE, IDAHO 21,000 | 528 | 1  4 |
| PORTLAND, ORE. 258,000 | 506 | 10  12 |
| SEATTLE WH. 315,000 | 187 | 8  5 |

Inventor
Philip R. Perkins

By C. C. Shepherd
Attorney

Patented Dec. 4, 1923.

1,476,175

UNITED STATES PATENT OFFICE.

PHILIP R. PERKINS, OF COLUMBUS, OHIO.

GAME.

Application filed July 30, 1921. Serial No. 488,579.

*To all whom it may concern:*

Be it known that PHILIP R. PERKINS, a citizen of the United States, residing at Columbus, in the county of Franklin and State of Ohio, has invented certain new and useful Improvements in Games, of which the following is a specification.

This invention relates to an improved game adapted for use by children and others for the purpose of providing helpful amusement, and which will furnish a source of instruction to its players by reason of geographical features found therein, which features are necessary to observe and study to effect the progress in playing the game.

An object of the invention resides in the provision of a game of this character wherein is provided a board or playing surface having a map of any suitable locality provided thereon, the said map having principal locations, such as cities, clearly specified thereon which are grouped and suitably designated to produce what may be termed routes, and in providing game pieces consisting of movable devices adapted to traverse the said routes by the turn of indicating devices and in accordance with certain prescribed rules of the game, the purpose in view being to provide an amusement furnishing means which will direct the players' attention to the locations of the various stopping places provided in this route, to know the relative distances between such locations, the sizes from a standpoint of population of each location and at the same time to provide efficient interest to maintain the players in suspense as to the outcome of the game and to generally excite and hold the interests of the players.

Figure 1:
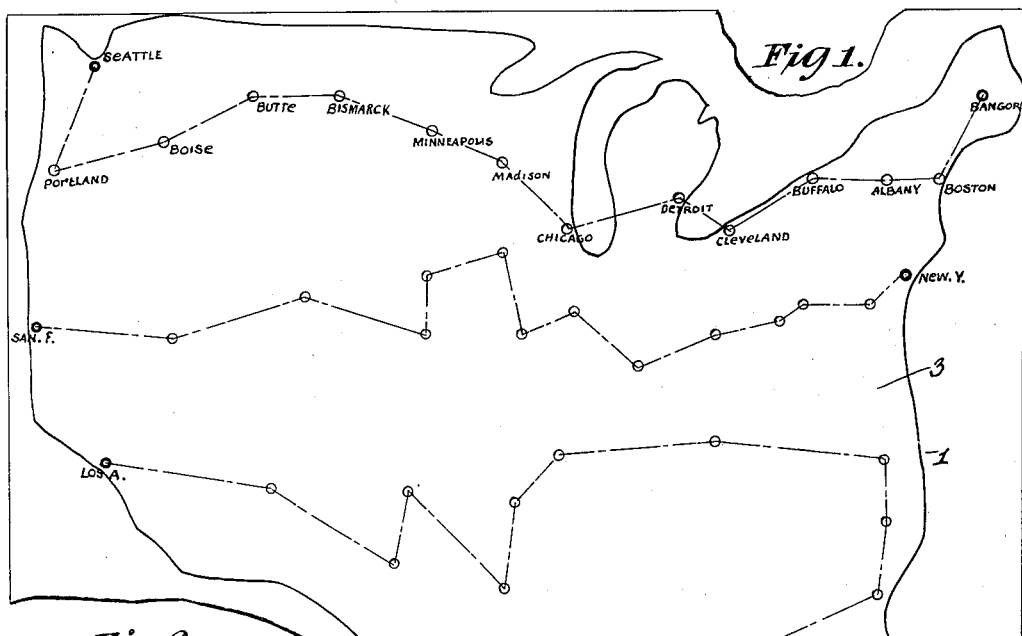
Figure 3:
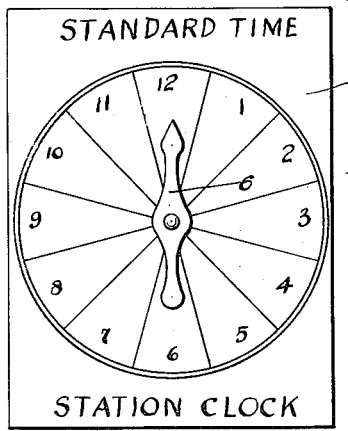
Figure 4:
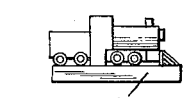

For a further understanding of the invention reference is to be had to the following description, and to the accompanying drawing, in which, Figure 1 is a plan view of the game board utilized by the invention, Figure 2 is a view of one of the time tables, Figure 3 is a plan view of the indicator, and Figure 4 is a detail view of one of the game pieces.

Referring more particularly to the details of the invention, use is made of a game 1, which is formed to include a board having a playing surface 2 provided thereon, and said board being either flexible or rigid, as desired, but when flexible the board may be folded so as to occupy but a minimum of space. The playing surface 2 has suitably designated thereon and attractively finished a colored map 3 which may be of any suitable place or locality, in the present instance the map is that of the United States of America, but it will be understood that the map may represent the world, or any specific continent, hemisphere or any portion or subdivision thereof. However, in the present instance the map 3 has the various principal cities of the United States designated thereon and suitably marked to make their names known to the players of the game, and these points or locations are grouped together to define routes, which are adapted to be traversed in a prescribed manner by one or more of the players.

In conjunction with the playing board, the invention contemplates the provision of time tables or guide charts, designated by the numeral 4. Each of these time tables has a caption denoting the particular route to which it is applicable. For instance, one time table is adapted for the route leading from the station Bangor to the station Seattle, and to this end the said time table includes a list of the names of the various cities traversed in said route. The time table gives the name of the station, the State in which it is located and the population, also the relative distances between any two of the stations involved in the route. In conjunction with this data each station is provided with what may be termed departure numerals, which numerals are capable of coinciding with the numerals found upon an indicator 5. This indicator simply consists of a dial, bearing numbers, or other suitable indicia, ranging from 1 to 12, which numbers are suitably pointed to by means of a rotatable hand 6, which is adapted to be revolved by the players.

In using the game each player is provided with a game piece 7, and the players, if there are more than one, may either select the same route or each may select different routes, each route being provided with the same number of stations. Then, one player operates the indicator by spinning the hand 6 in his respective turn until the hand 6 points to a number on the indicator, which corresponds with any one of the departure numbers on the time table. For example, if a player has selected the route Bangor to Seattle it will be necessary before proceeding to the next station, viz, Boston, Mass., to spin the indicator until its hand points to either the number 7 or 2, which correspond to the departure numerals. The player may then move his game piece to the station marked Boston and when his proper turn arrives, the indicator is again operated until the same denotes 12 or 11, permitting the player to move on to the next station, Albany, N. Y. The players take their usual turns in operating the indicator, and the pieces are moved whenever the indicator hand points to a number corresponding with the departure numbers of any of the stations on which the pieces are located. The player first reaching a final destination of his particular route is declared the winner of the game. It will be observed that this game is one which is capable of retaining the interests of its players and is one which may be usefully employed in teaching many geographical facts.

What is claimed is:

A game comprising a playing surface having a map provided thereon, the principal localities on said map serving as stations, the stations being grouped together to produce a route having starting and terminating points remote from each other, time tables containing a list of the names of the stations involved in said route, grouped multiple departure indicia provided on said time tables opposite the name of each of said stations, and an indicator having indicia thereon corresponding to one of the indicia of each group of the departure indicia, whereby when said indicia corresponds with one of the group of indicia of the time table game pieces may be moved to traverse the stations set forth in said route.

In testimony whereof I affix my signature.

PHILIP R. PERKINS.